(12) United States Patent
Kato et al.

(10) Patent No.: US 11,777,296 B2
(45) Date of Patent: Oct. 3, 2023

(54) WIRE HARNESS INSTALLATION STRUCTURE

(71) Applicant: Yazaki Corporation, Tokyo (JP)

(72) Inventors: Shinji Kato, Makinohara (JP); Tatsuya Otsuka, Makinohara (JP); Tomohiro Shibata, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 1 day.

(21) Appl. No.: 17/207,949

(22) Filed: Mar. 22, 2021

(65) Prior Publication Data
US 2021/0305799 A1 Sep. 30, 2021

(30) Foreign Application Priority Data
Mar. 24, 2020 (JP) .................................. 2020-052111

(51) Int. Cl.
*H02G 11/00* (2006.01)
*H02G 3/04* (2006.01)
*B60R 16/02* (2006.01)

(52) U.S. Cl.
CPC ........... *H02G 11/00* (2013.01); *H02G 3/0406* (2013.01); *B60R 16/0215* (2013.01)

(58) Field of Classification Search
CPC .. B60R 16/07; B60R 16/0207; B60R 16/0215
See application file for complete search history.

(56) References Cited

U.S. PATENT DOCUMENTS

| | | | | |
|---|---|---|---|---|
| 7,854,413 B2 * | 12/2010 | Yamamoto | ............... | F16L 3/015 296/146.7 |
| 8,198,533 B2 * | 6/2012 | Terada | ................ | B60R 16/0215 174/72 A |
| 2003/0184119 A1 * | 10/2003 | Doshita | ................. | B60R 16/027 296/155 |
| 2007/0267211 A1 * | 11/2007 | Yamamoto | .......... | B60R 16/0207 174/68.1 |
| 2008/0035800 A1 * | 2/2008 | Yamamoto | ............... | F16L 3/015 248/70 |
| 2009/0101407 A1 * | 4/2009 | Yamamoto | .......... | B60R 16/0215 174/72 A |
| 2015/0330130 A1 * | 11/2015 | Terada | ................ | E05D 11/0081 16/223 |

FOREIGN PATENT DOCUMENTS

| EP | 2 050 624 A2 | 4/2009 | |
|---|---|---|---|
| JP | 2008048521 A | 2/2008 | |
| JP | 2010041841 A * | 2/2010 | ......... H02G 16/0215 |

\* cited by examiner

*Primary Examiner* — Paresh Paghadal
(74) *Attorney, Agent, or Firm* — Sughrue Mion, PLLC

(57) ABSTRACT

A wire harness installation structure includes a wire harness, a protector, and a bending motion mechanism that causes the wire harness to make a bending movement. The wire harness has a first portion that is fixed to the protector, a second portion that is distant from both of the first portion and the protector beyond a bending position of the wire harness, and a third portion that is located between the first portion and the second portion. The second portion and the third portion of the wire harness are fixed on a movable member of the bending motion mechanism, and the wire harness is routed so that a second excess length between the second portion and the third portion is shorter than a first excess length between the first portion and the third portion.

14 Claims, 15 Drawing Sheets

WIRE HARNESS INSTALLATION STRUCTURE

CROSS-REFERENCE TO RELATED APPLICATIONS

This application is based on and claims priority under 35 USC 119 from Japanese Patent Application No. 2020-052111 filed on Mar. 24, 2020, the contents of which are incorporated herein by reference.

TECHNICAL FIELD

The present disclosure relates to a wire harness installation structure for installing a wire harness so that it can make a bending movement.

BACKGROUND ART

Among wire harnesses that are used for electrically connecting devices installed in a motor vehicle are ones that are routed along a prescribed path and ones that are routed so as to be able to bend and extend so as to follow a movement of a movable portion of a motor vehicle. For example, JP-A-2008-48521 discloses a wire harness installation structure of the latter type.

In JP-A-2008-48521, a wire harness has a bending/extending portion (bendable portion) that is exposed to the outside. Thus, if the wire harness deflects (flutters) when it is bent or extended and interferes with, for example, another device, not only the other device but also a bending/extending portion may be damaged. One countermeasure would be to control the deflection (bend) of the wire harness by installing a protector. However, where the deflection range (bending interval) of the bending/extending portion is large, a large protector needs to be installed. A large protector is costly and requires a storage space before the installation. After the installation of the large protector, a proper space needs to be secured around the bending/extending portion.

SUMMARY OF INVENTION

The present disclosure has been made in view of the above circumstances, and an object of the invention is therefore to provide a wire harness installation structure capable of miniaturizing a protector for controlling deflection of a bendable portion of a wire harness.

To attain the above object, the invention provides a wire harness installation structure including:
  a wire harness having bend flexibility;
  a protector configured to protect the wire harness while allowing the wire harness to make a bending movement about a bending position of the wire harness, the bending position being located between both ends of the wire harness; and
  a bending motion mechanism that causes the wire harness to make the bending movement, in which:
  the wire harness has a first portion that is fixed to the protector, a second portion that is distant from both of the first portion and the protector beyond the bending position, and a third portion that is located between the first portion and the second portion, and the third portion is offset in a direction of the bending movement from an imaginary straight line connecting the first portion and the second portion; and the second portion and the third portion of the wire harness are fixed on a movable member of the bending motion mechanism, and the wire harness is routed so that a second excess length between the second portion and the third portion is shorter than a first excess length between the rust portion and the third portion.

In the above aspect of the disclosure, the first portion, the second portion, and the third portion are set in the wire harness, the first portion is fixed on the protector, and the second portion and the offset third portion are fixed on the movable member of the bending motion mechanism. Furthermore, as for excess lengths that are necessary for bending of the wire harness, the wire harness is routed so that the excess length (second excess length) between the second portion and the third portion is shorter than the excess length (first excess length) between the first portion and the third portion. Thus, the bending interval of the wire harness can be made shorter than in conventional cases, as a result of which the wire harness installation structure provides an advantage that deflection (a bend that leads to fluttering) occurring during bending/extending of the wire harness can be controlled more easily (the advantage will be described later in embodiments). Since deflection (a bend that leads to fluttering) of the wire harness can be controlled more easily, another advantage can be obtained that the protector can be miniaturized.

In the wire harness installation structure according to the disclosure, the first portion of the wire harness is fixed on the protector and the second portion and the offset third portion are fixed on the movable member of the bending motion mechanism. Furthermore, as for excess lengths that are necessary for bending of the wire harness, the wire harness is routed so that the excess length between the second portion and the third portion is shorter than the excess length between the first portion and the third portion. Thus, the bending interval of the wire harness can be made shorter than in conventional cases, as a result of which the wire harness installation structure provides an advantage that deflection (a bend that leads to fluttering) occurring during bending/extending of the wire harness can be controlled more easily. Since deflection of the wire harness can be controlled more easily, another advantage can be obtained that the protector can be miniaturized.

DETAILED DESCRIPTION OF EMBODIMENT

A wire harness installation structure according to the present disclosure includes a wire harness having bend flexibility, a protector which protects the wire harness while allowing the wire harness to make a bending movement about a halfway bending position of the wire harness, and a bending motion mechanism which causes the wire harness to make the bending movement. The wire harness has a first portion that is set at a position where the wire harness is fixed to the protector, a second portion that is set at a position that is distant from the first portion and the protector beyond the bending position, and a third portion that is set at a position located between the first portion and the second portion. The position of the third portion is offset from an imaginary straight line connecting the first portion and the second portion in a direction of the bending movement. The positions of the second portion and the third portion are fixed on movable members of the bending motion mechanism, and the wire harness is routed so that a second excess length that is an excess length between the second portion and the third portion is shorter than a first excess length that is an excess length between the first portion and the third portion.

Figure 1:
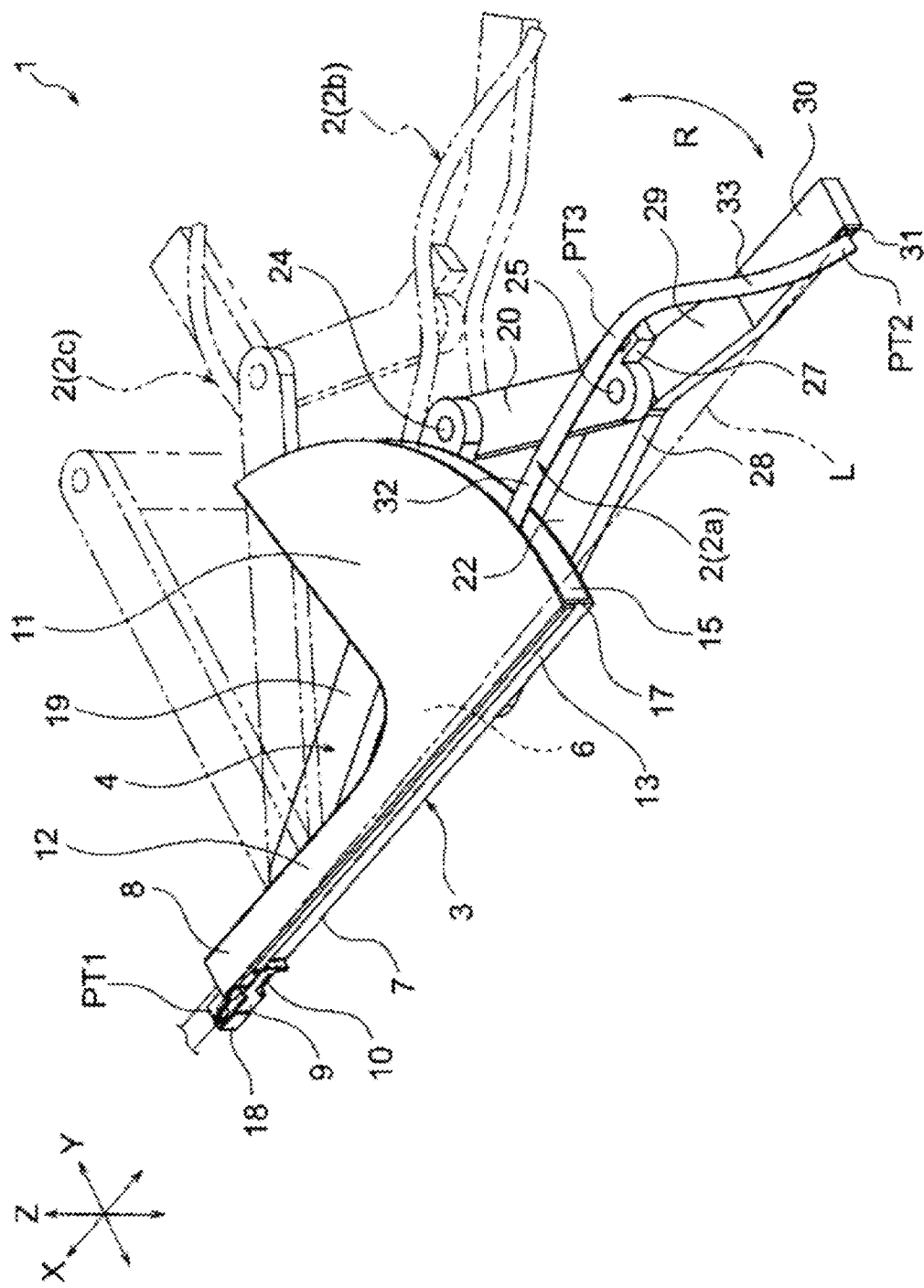
FIG. 1 is a perspective view, as viewed from the side of a protector, of a wire harness installation structure according to an embodiment of the present disclosure.
Figure 2:
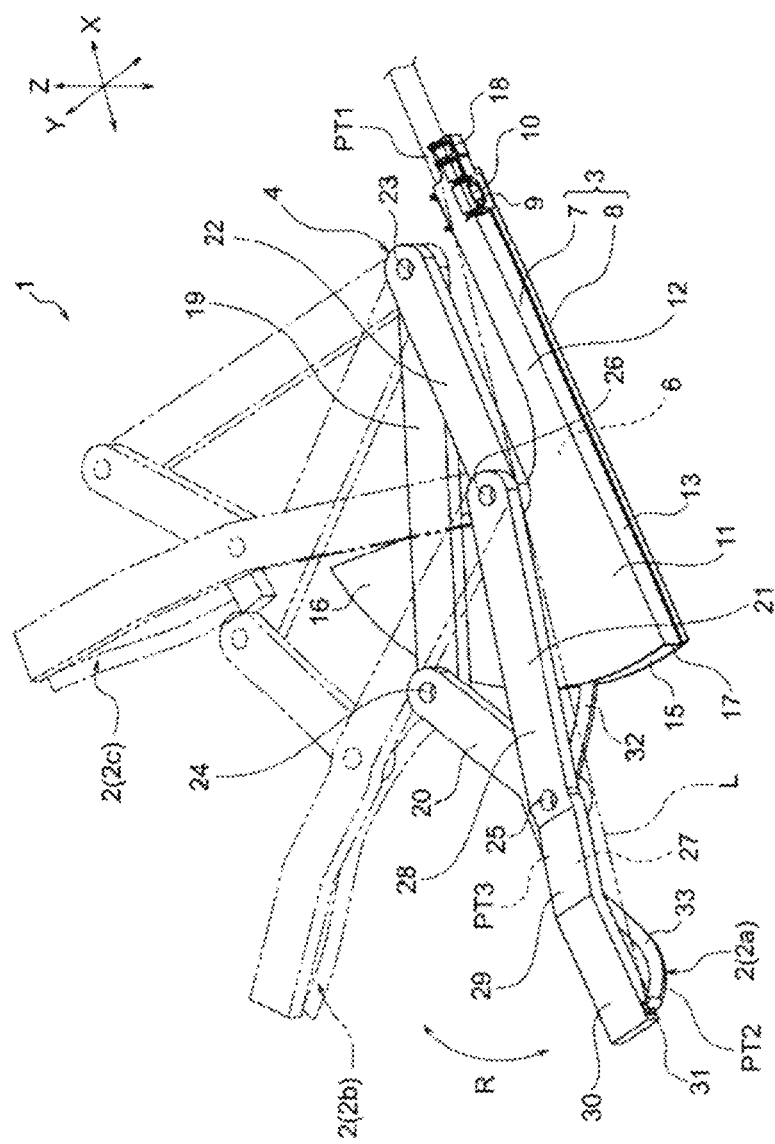
FIG. 2 is a perspective view, as viewed from the side of a bending motion mechanism, of the wire harness installation structure shown in FIG. 1.
Figure 3:
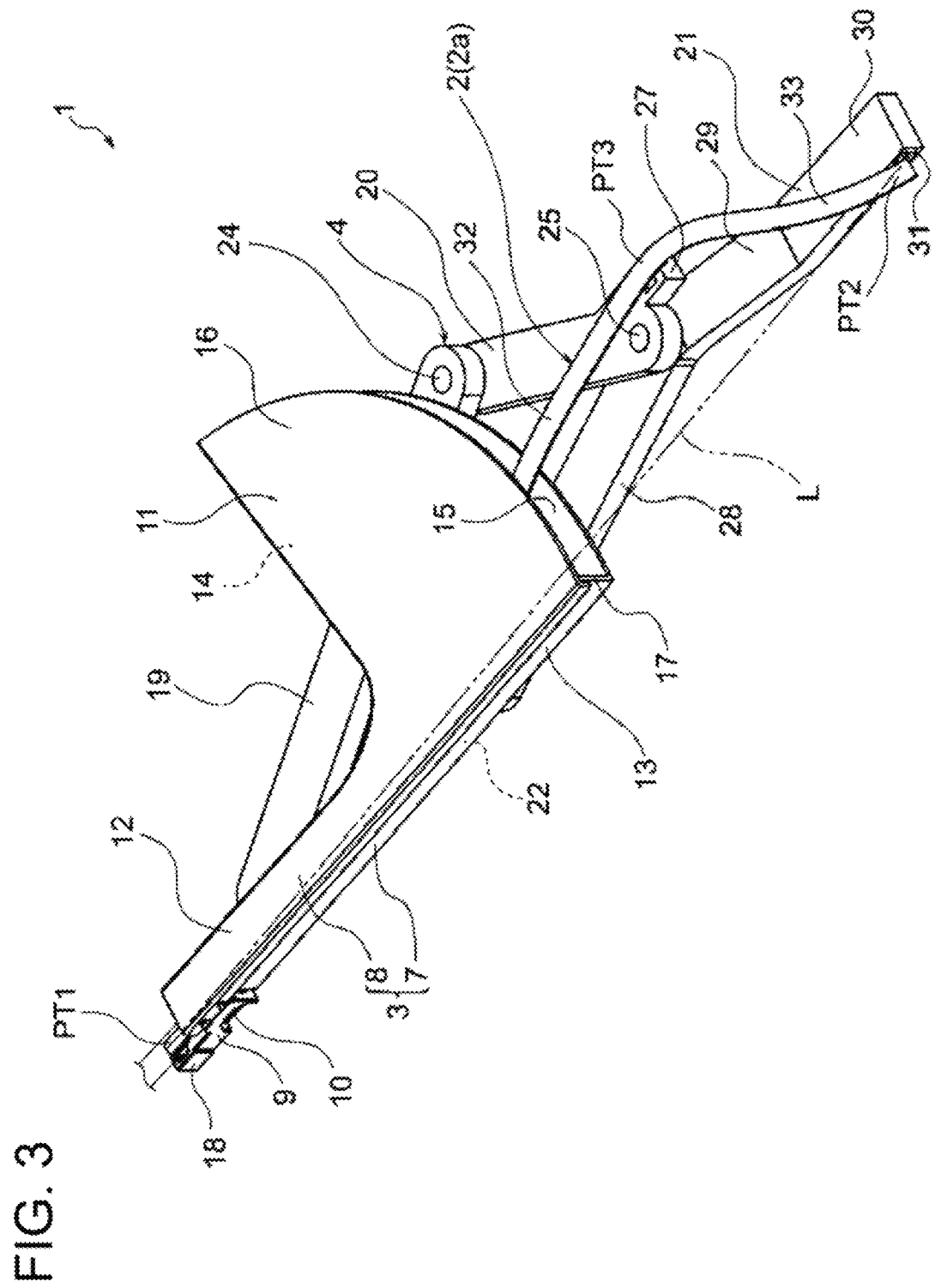
FIG. 3 is a perspective view, as viewed from the side of a protector, of a wire harness installation structure and illustrates a routing state of a case that the wire harness is stretched.
Figure 4:
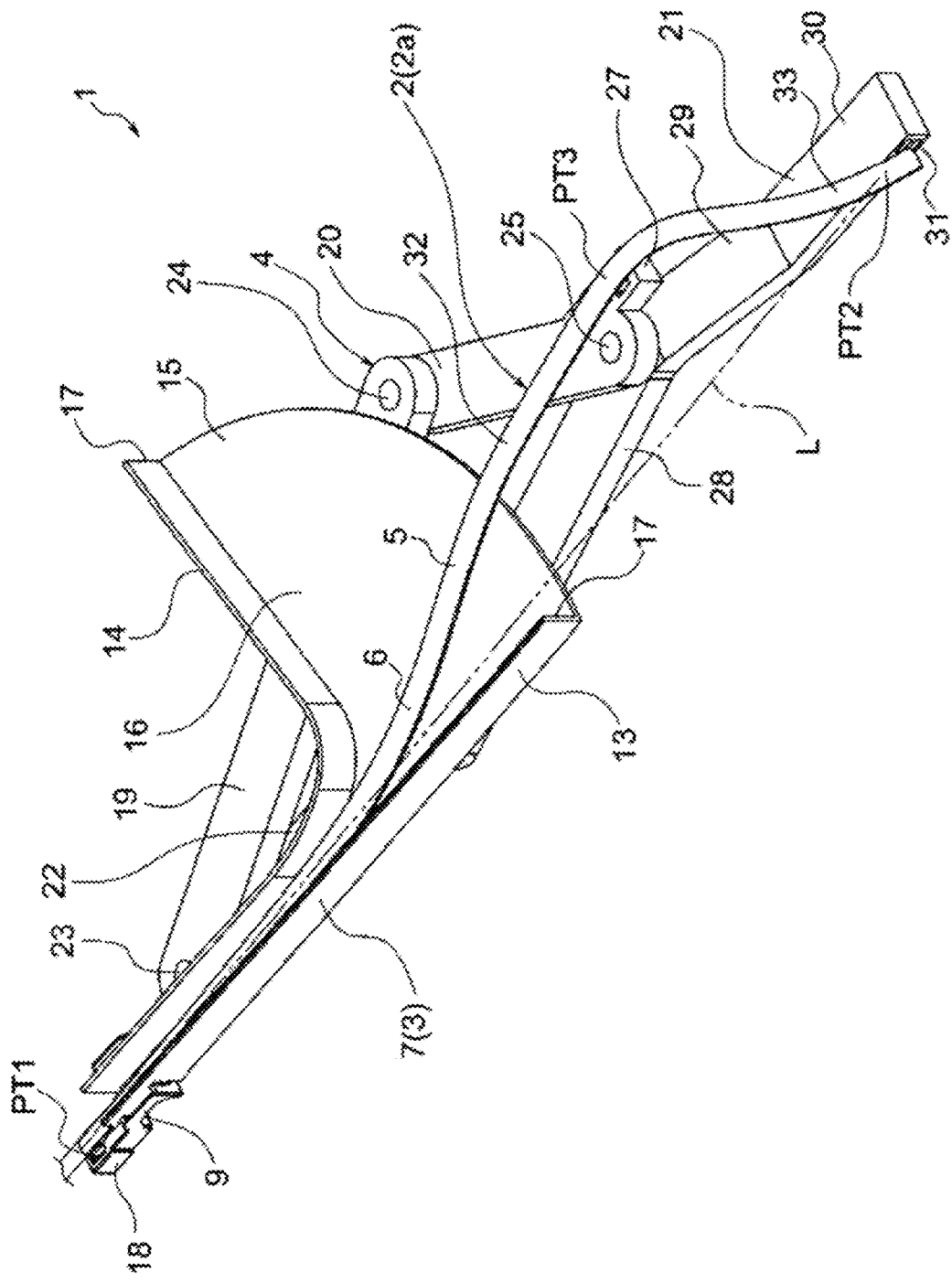
FIG. 4 is a perspective view, corresponding to FIG. 3, of the wire harness installation structure in a state that a protector cover is removed.
Figure 5:
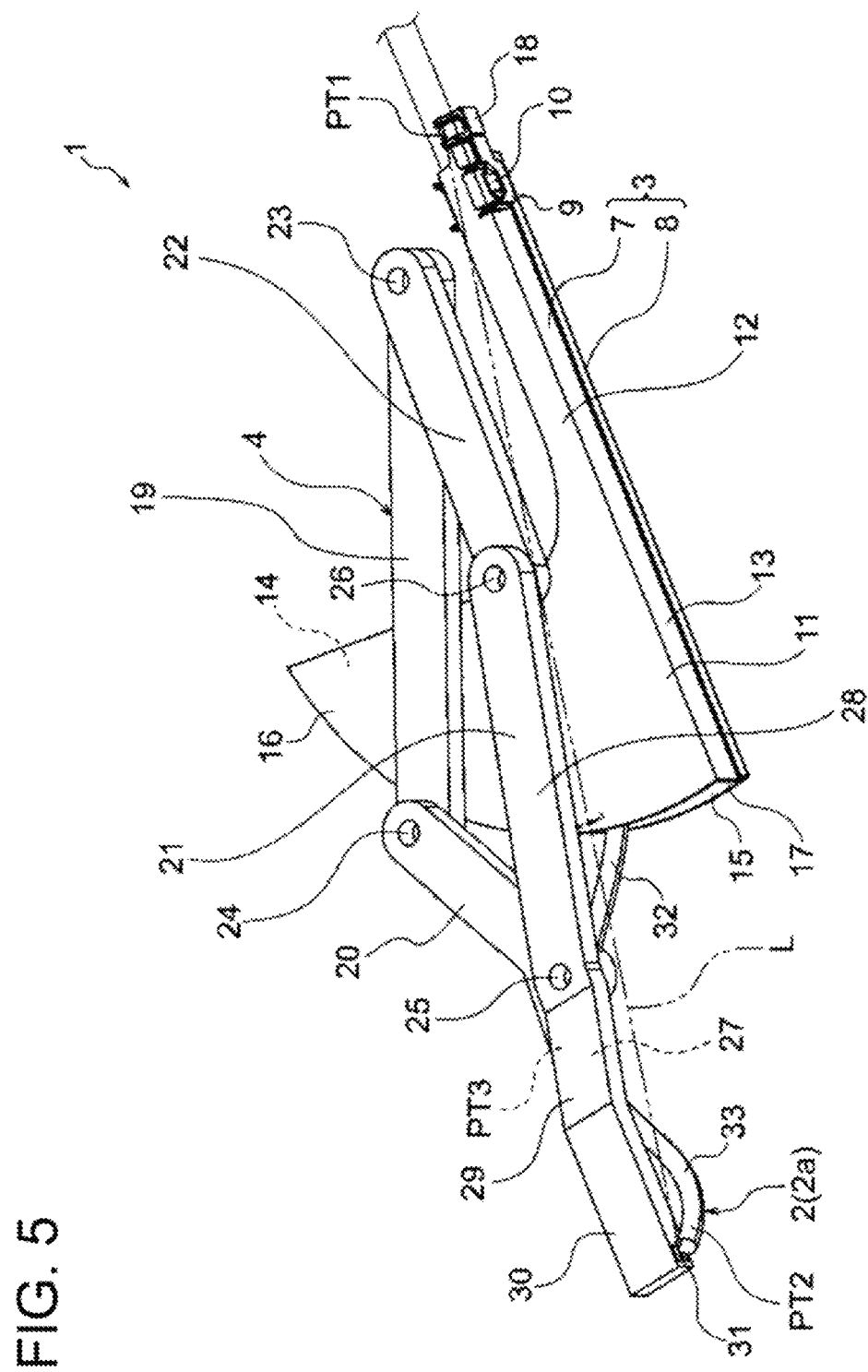
FIG. 5 is a perspective view, as viewed from the side of the bending motion mechanism, of the wire harness installation structure shown in FIG. 3.
Figure 6:
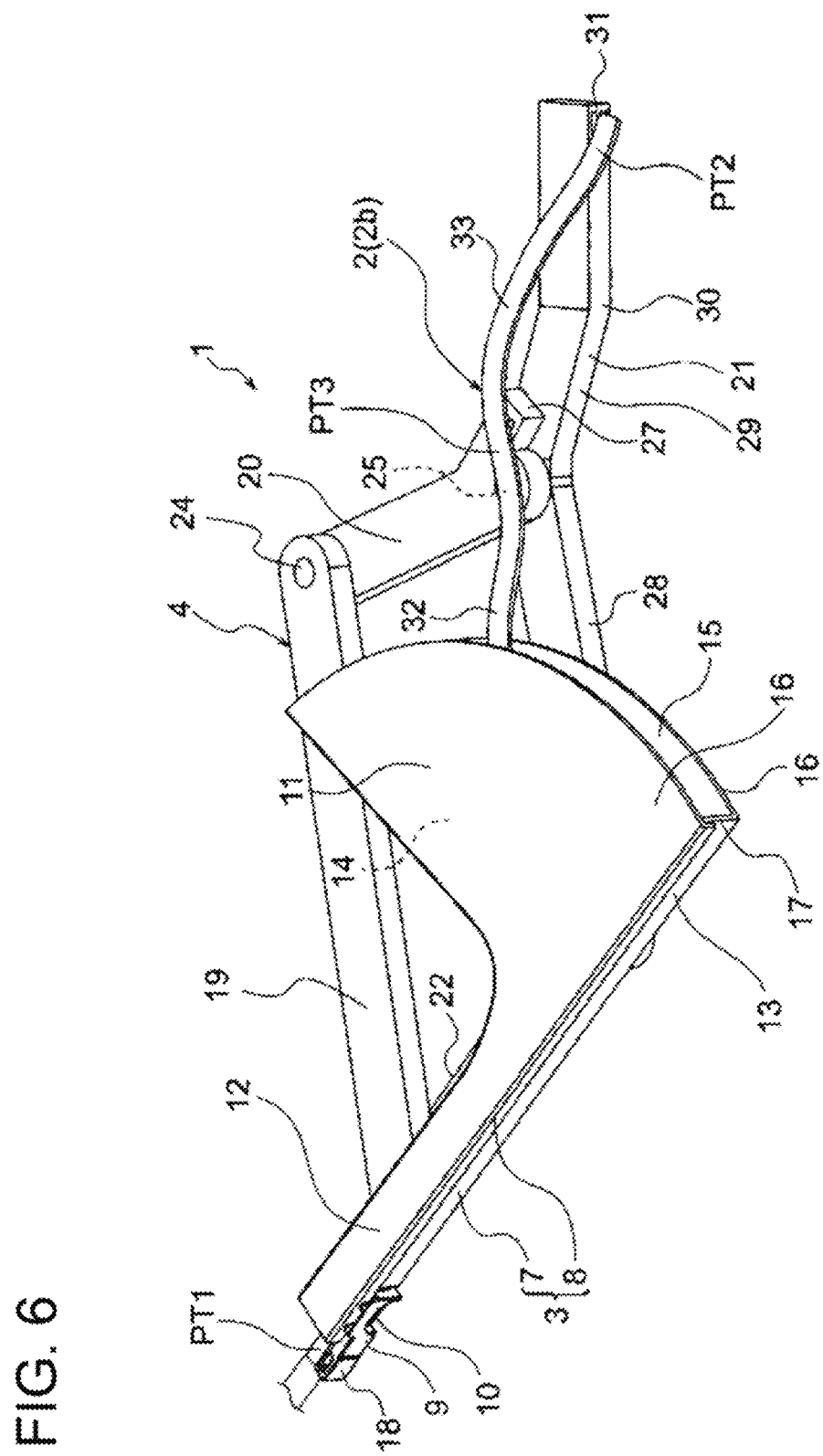
FIG. 6 is a perspective view, as viewed from the side of the protector, of the wire harness installation structure and illustrates a routing state of a case that the wire harness is bent halfway.
Figure 7:
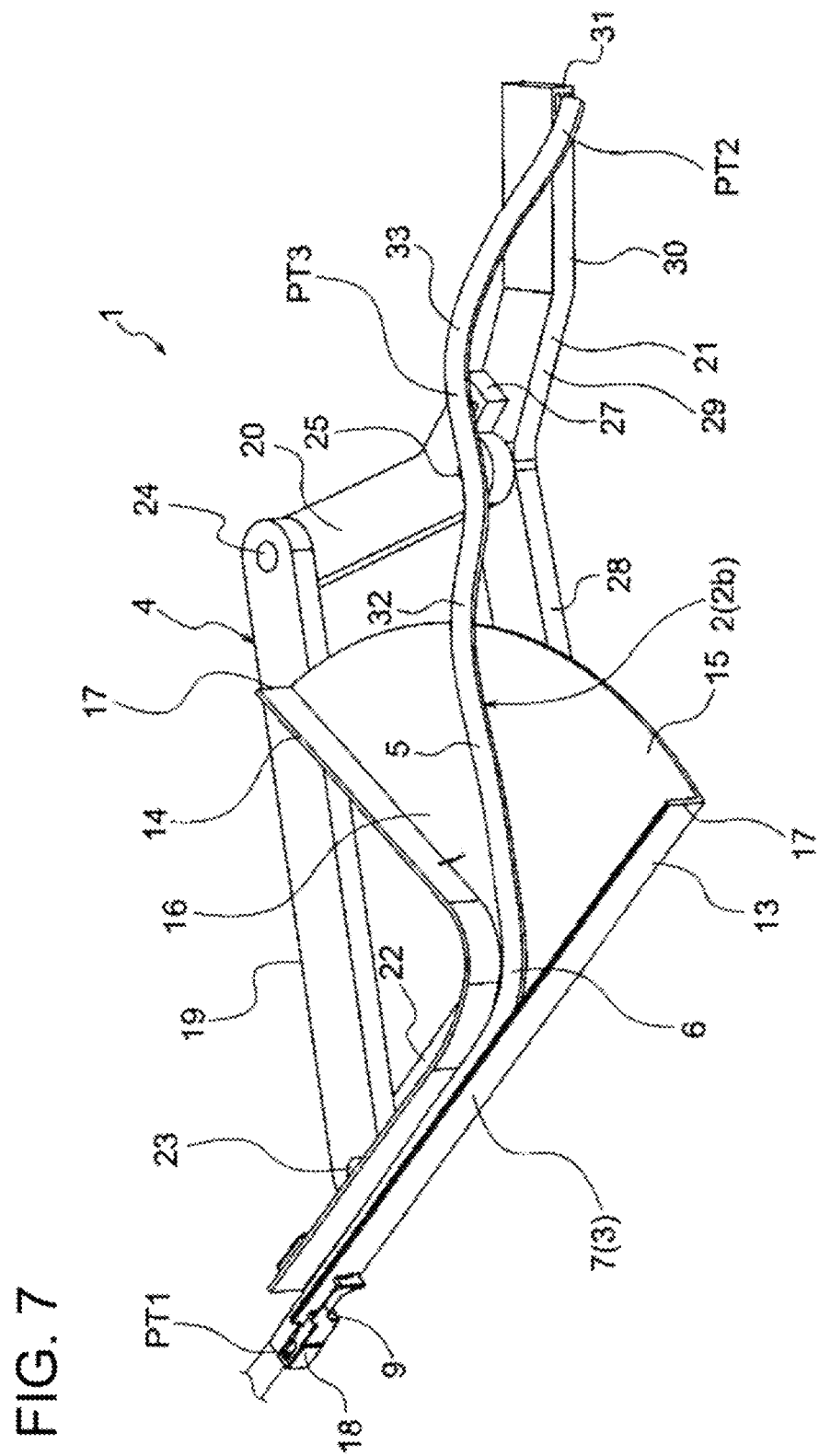
FIG. 7 is a perspective view, corresponding to FIG. 6, of the wire harness installation structure in a state that the protector cover is removed.
Figure 8:
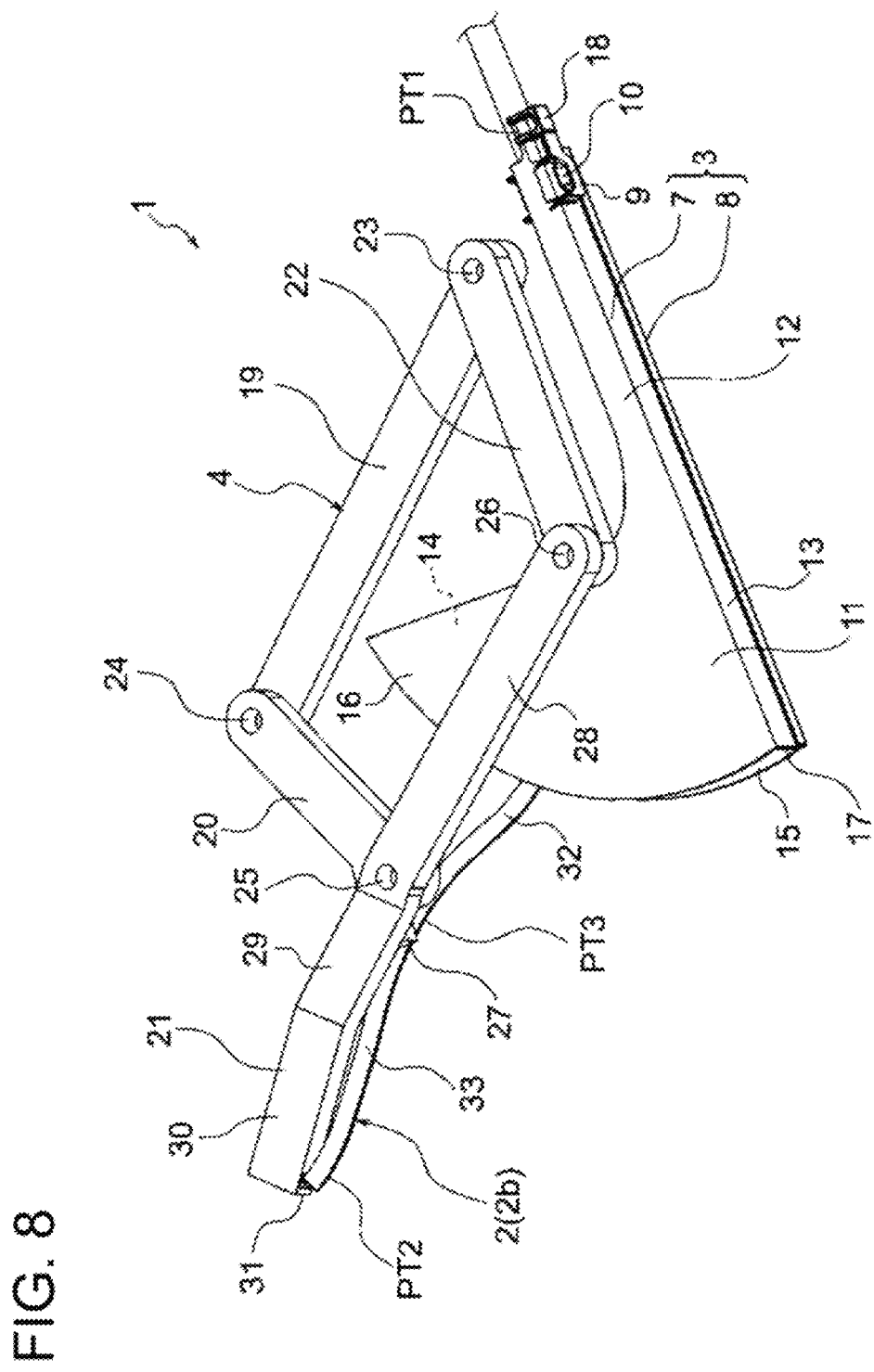
FIG. 8 is a perspective view, as viewed from the side of the bending motion mechanism, of the wire harness installation structure shown in FIG. 6.
Figure 9:
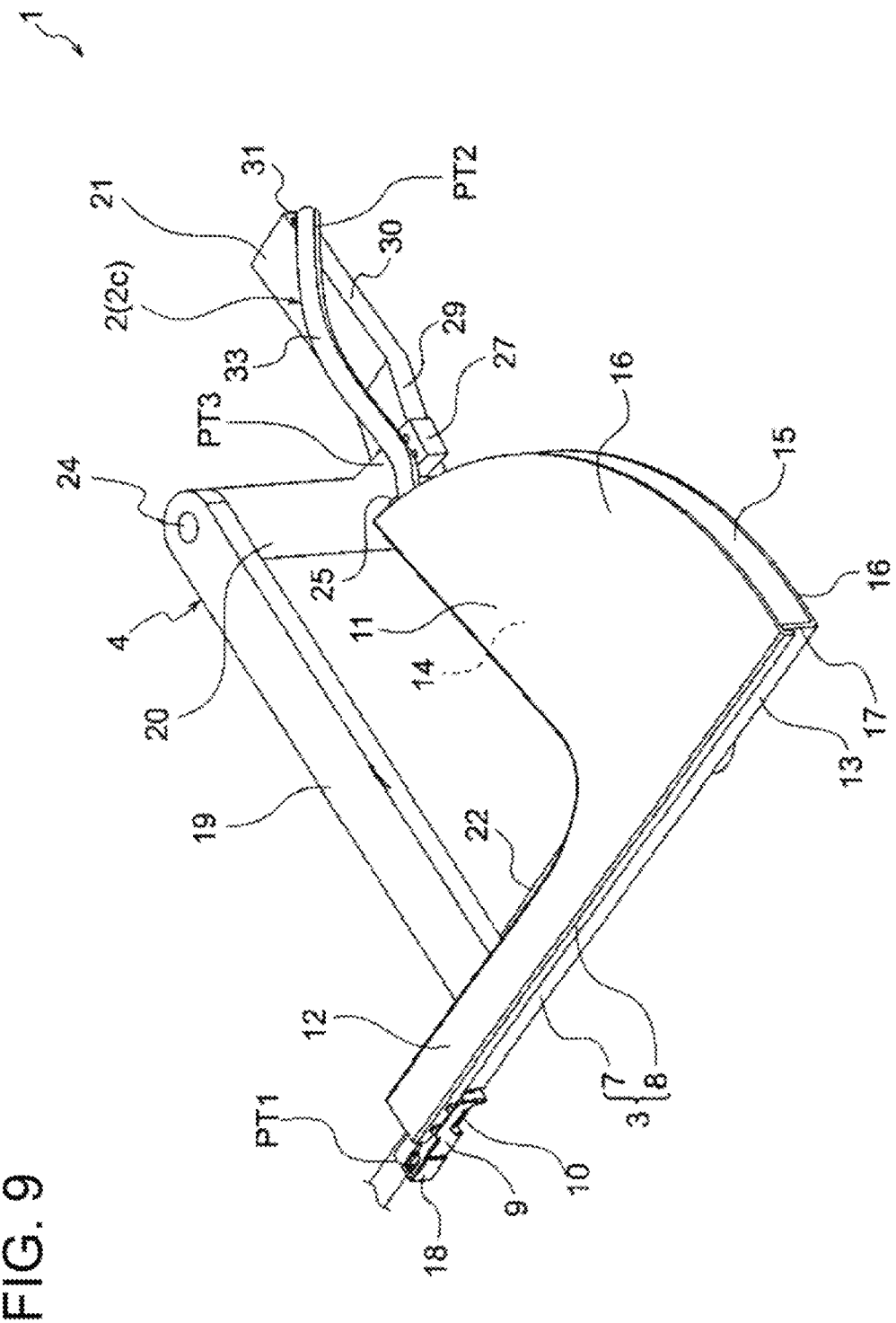
FIG. 9 is a perspective view, as viewed from the side of the protector, of the wire harness installation structure and illustrates a routing state of a case that the wire harness is bent fully.
Figure 10:
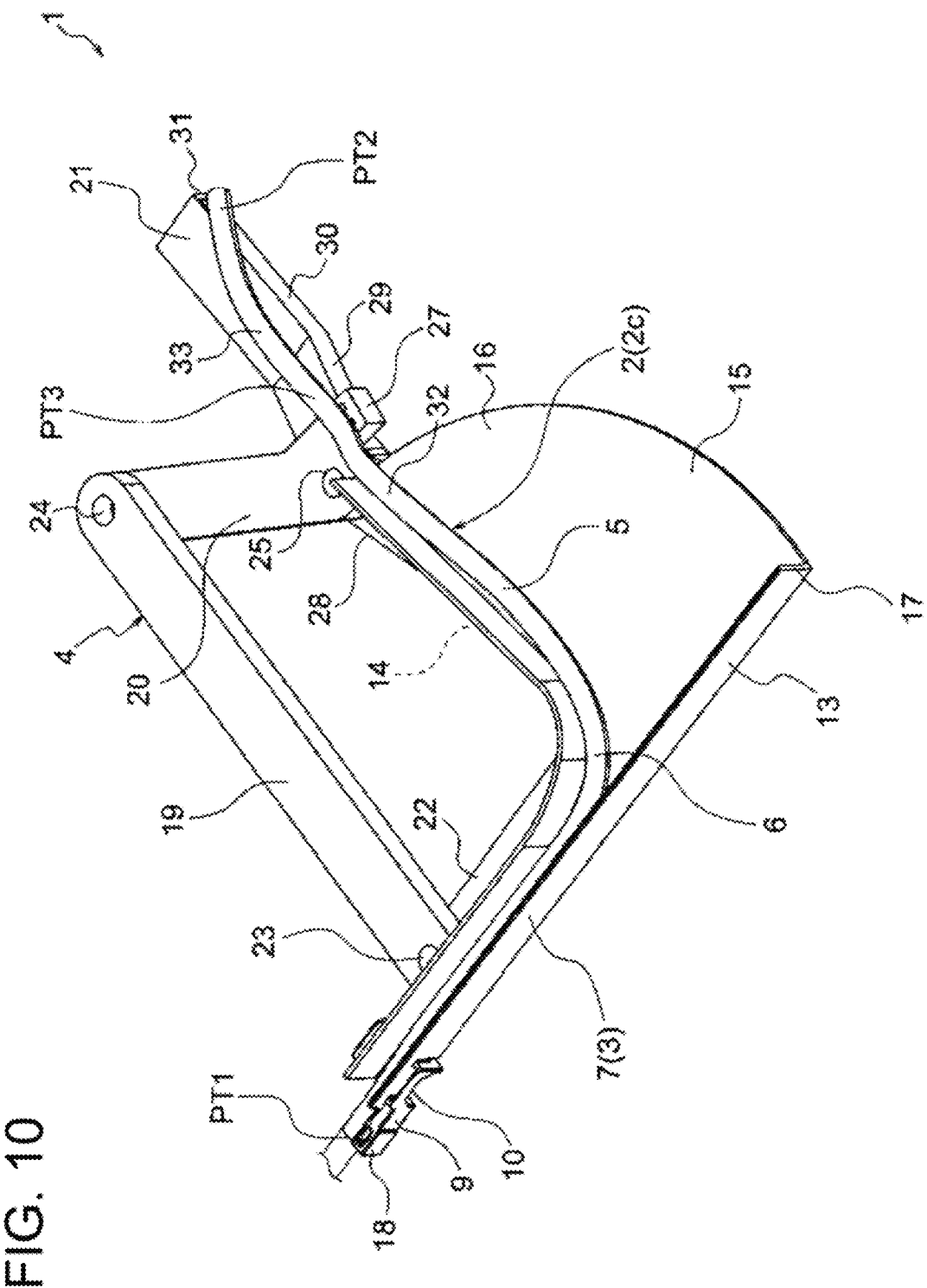
FIG. 10 is a perspective view, corresponding to FIG. 9, of the wire harness installation structure in a state that the protector cover is removed.
Figure 11:
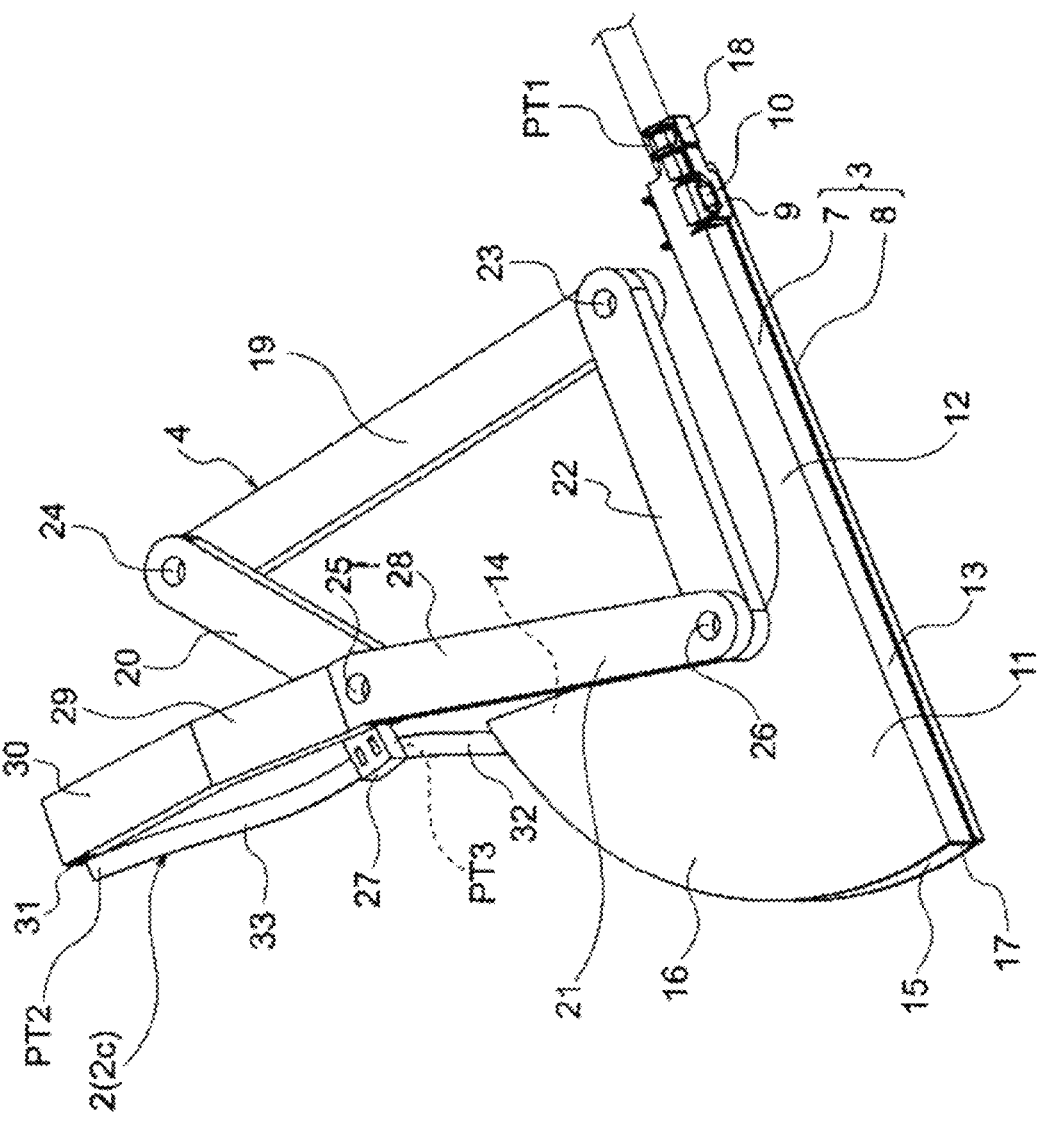
FIG. 11 is a perspective view, as viewed from the side of the bending motion mechanism, of the wire harness installation structure shown in FIG. 9.
Figure 12:
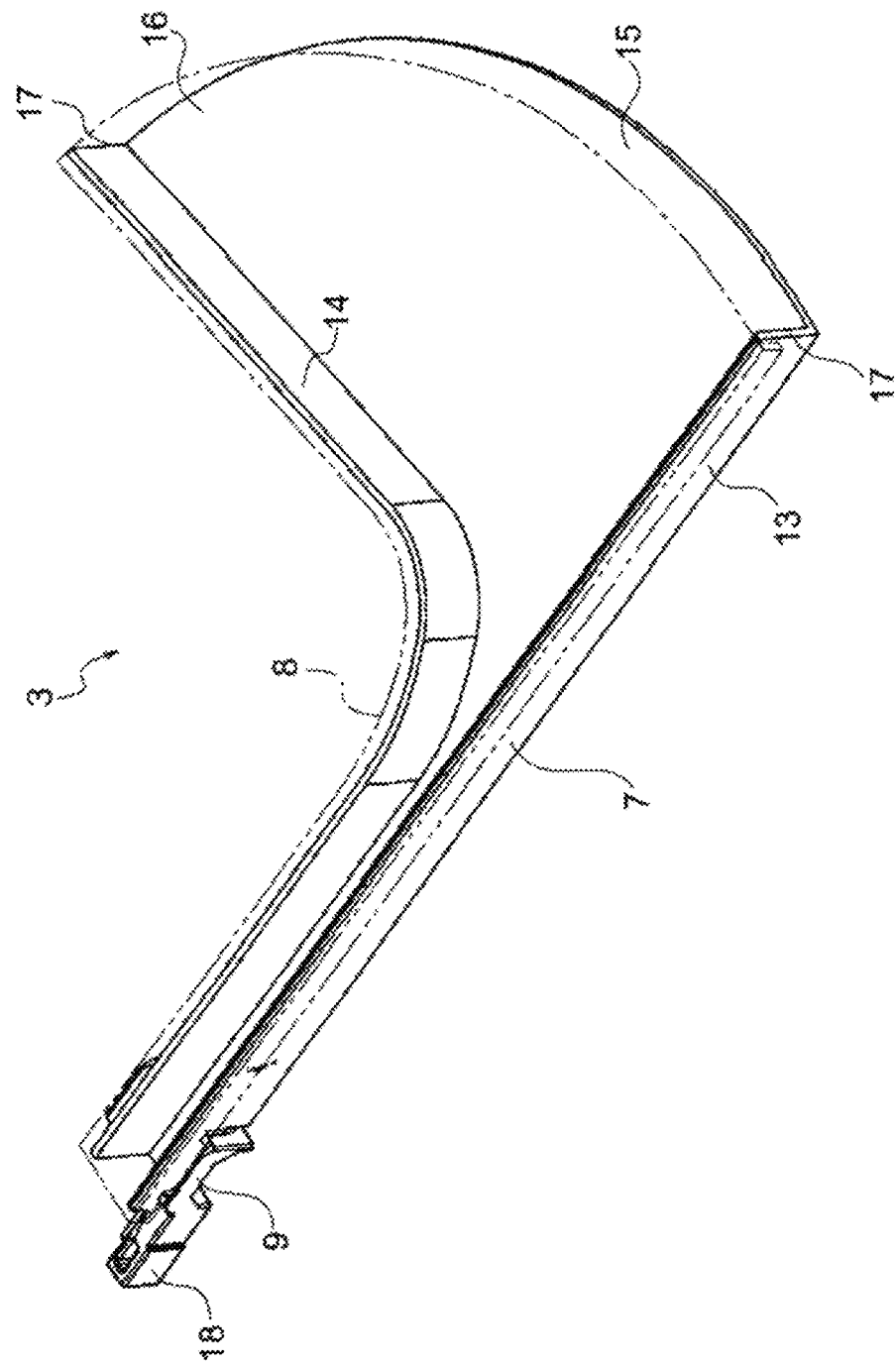
FIG. 12 is an enlarged perspective view of the protector.
Figure 13:
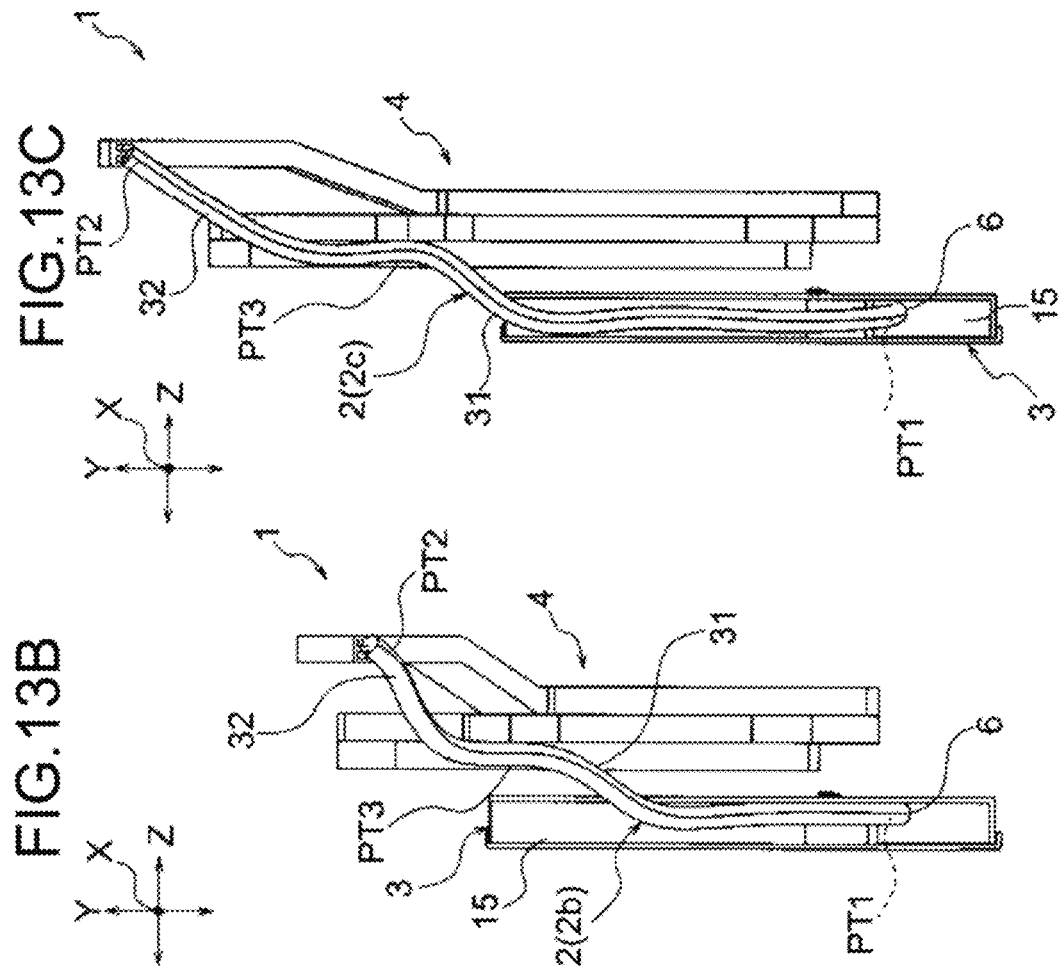
FIGS. 13A to 13C are views, as viewed from the direction X, of the wire harness installation structure in states that the wire harness is stretched, bent halfway, and bent fully, respectively.
Figure 14:
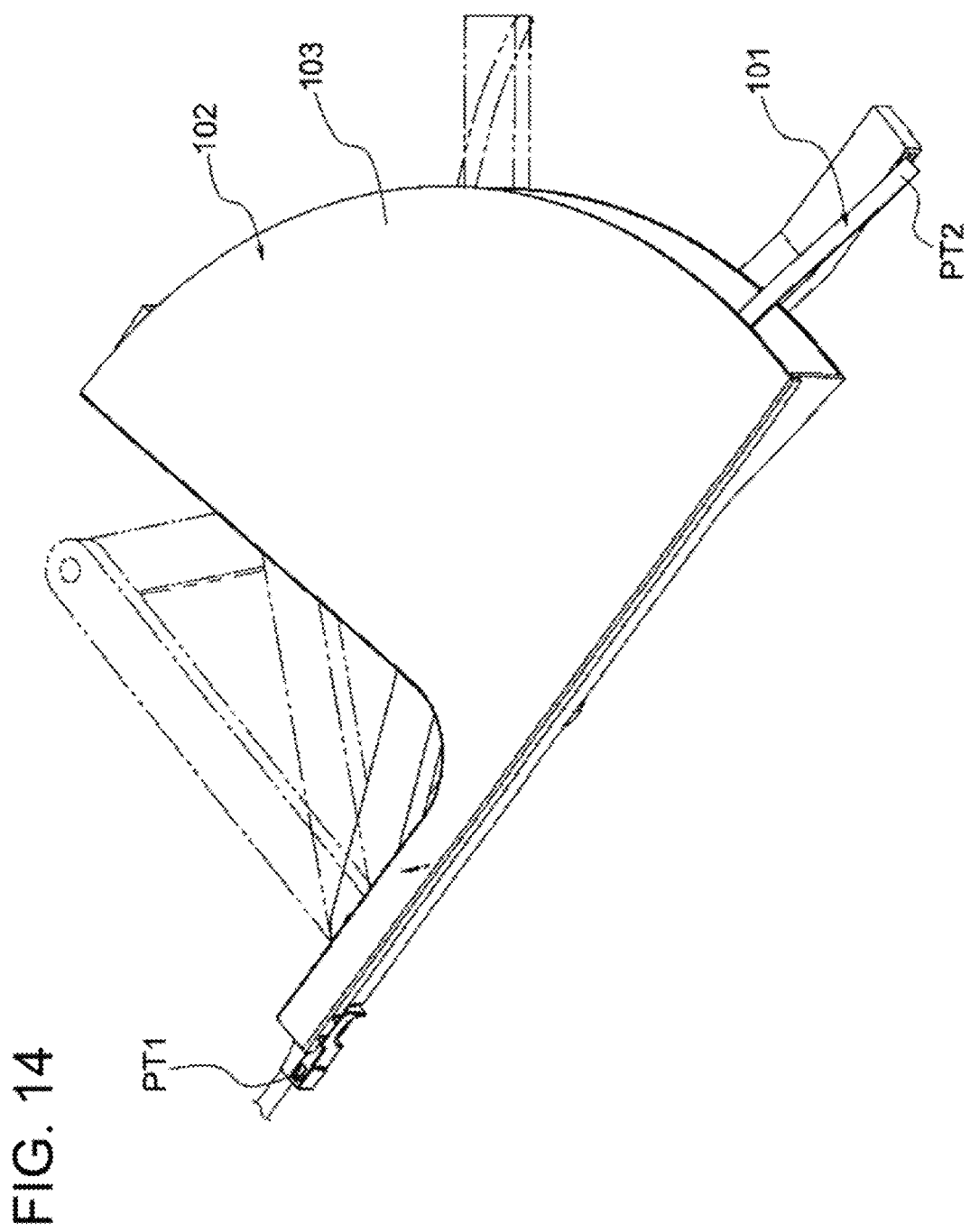
FIG. 14 is a perspective view of a wire harness installation structure of Comparative Example having a large protector.
Figure 15:
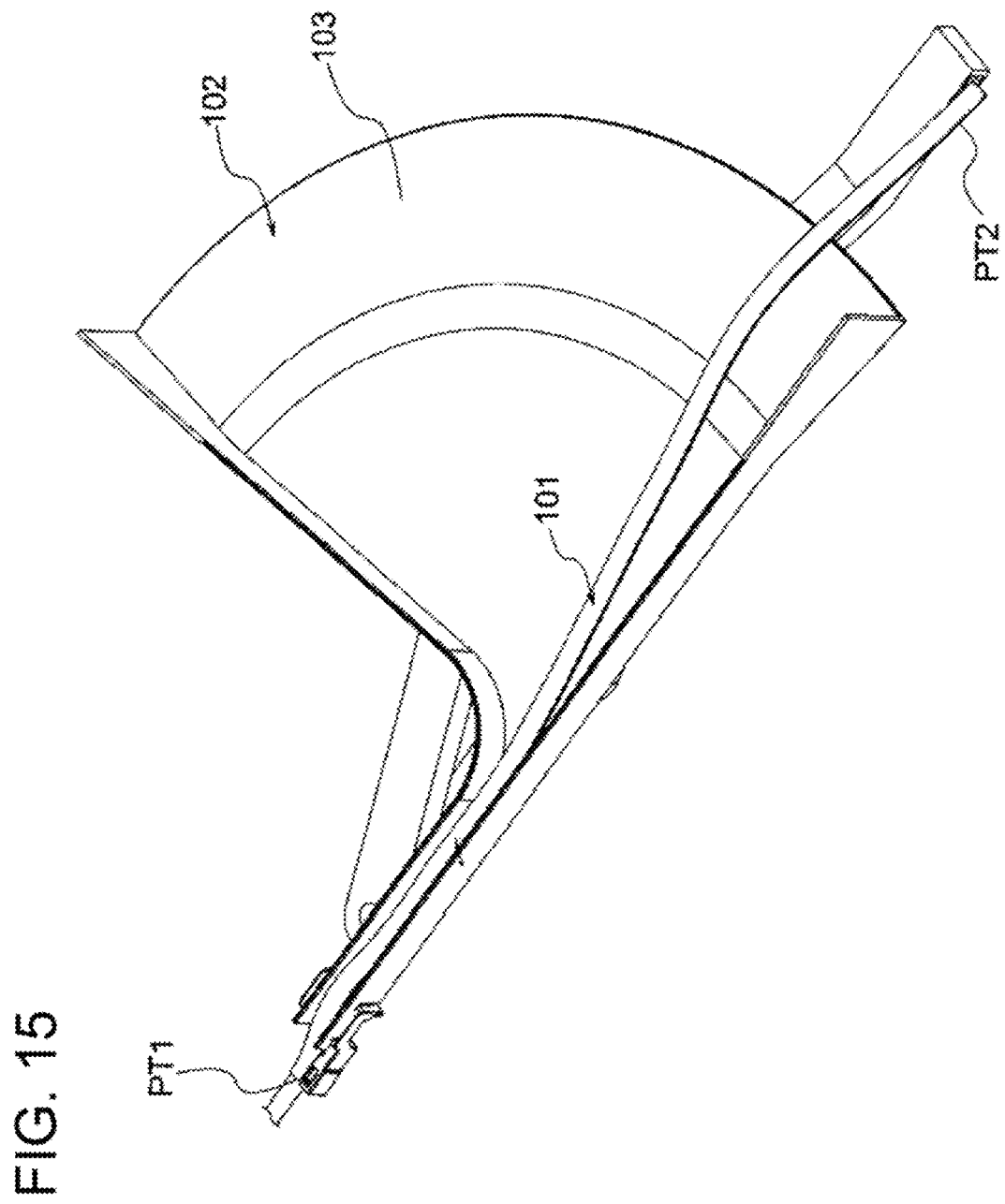
FIG. 15 is a perspective view, corresponding to FIG. 14, of the wire harness installation structure of Comparative Example in a state that the protector cover is removed.

An embodiment of the invention will be hereinafter described with reference to the drawings. FIGS. 1 and 2 are perspective views showing a wire harness installation structure according to the embodiment. FIGS. 3 to 5 are perspective views showing a routing state of a case that a wire harness is stretched. FIGS. 6 to 8 are perspective views showing a routing state of a case that the wire harness is bent halfway. FIGS. 9 to 11 are perspective views showing a routing state of a case that the wire harness is bent fully. FIG. 12 is an enlarged perspective view of a protector. FIGS. 13A to 13C are views, as viewed from the direction X, of the wire harness installation structure. FIGS. 14 and 15 are perspective view of a wire harness installation structure of Comparative Example.

<Wire Harness Installation Structure 1>

In FIGS. 1 and 2, reference symbol 1 denotes a wire harness installation structure according to the embodiment of the present disclosure. The wire harness installation structure 1 is employed in, for example, a motor vehicle as a structure for enabling bending and extending of an installed wire harness 2. The wire harness installation structure 1 includes the wire harness 2, a protector 3, and a bending motion mechanism 4. As will be understood from the following description, the wire harness installation structure 1 is configured so as to enable miniaturization of the protector 3 (made much smaller than in Comparative Example shown in FIGS. 14 and 15 (described later)). It is noted that the orientation of the wire harness installation structure 1 shown in each of FIG. 1, FIG. 2 and the like is just an example.

<Wire Harness 2>

Referring to FIGS. 1 and 2, the wire harness 2 is a single or plural electric wires or cables and has bend flexibility, that is, can be bent freely. Although only a middle part 5 of the wire harness 2 is shown in the embodiment, in actuality the wire harness 2 is longer than the part shown. A bending position 6 (see FIG. 10) is set in the middle part 5 of the wire harness 2 and the wire harness 2 is allowed to make a bending movement (bending/extending movement) about the bending position 6. Connectors for electrical connection are attached to respective terminals (not shown) of the wire harness 2 (the connectors are just examples).

In the embodiment, a first form 2a of the wire harness 2 is defined as corresponding to a "stretched routing state" shown by solid lines in FIGS. 1 and 2. A second form 2b of the wire harness 2 is defined as corresponding to a "halfway bent routing state" shown by two-dot chain lines. A third form 2c of the wire harness 2 is defined as corresponding to a "fully bent routing state" also shown by two-dot chain lines. The bending/extending state of the wire harness 2 varies in the range of the first form 2a to the third form 2c as it makes a bending motion as mentioned above.

A first portion, a second portion, and a third portion are defined for the wire harness 2 as points indicated by reference symbols PT1, PT2, and PT3, respectively. The first portion PT1, the second portion PT2, and the third portion PT3 are points that do not exist actually. It is assumed that the first portion PT1, the second portion PT2, and the third portion PT3 are spot-like ranges that are indicated by leader lines for these reference symbols. The second portion PT2 is most distant from the first portion PT1 and the third portion PT3 is located between the first portion PT1 and the second portion PT2. The third portion PT3 is set at a position that is offset in a direction R of a bending motion from an imaginary straight line L that connects the first portion PT1 and the second portion PT2. Manners of fixing etc. at the first portion PT1, the second portion PT2, and the third portion PT3 will be described later.

<Protector 3>

Referring to FIGS. 1, 2, and 12, the protector 3 is a resin mold member that is formed by molding an insulative resin material and is provided to protect the middle part 5 of the wire harness 2 and to control deflection (bend) of the middle part 5. The protector 3 has such a structure as to allow a bending movement about the bending position 6 (see FIG. 10) of the wire harness 2. The protector 3 includes a protector main body 7 and a protector cover 8. The protector main body 7 is a member for housing the middle part 5 of the wire harness 2 and is covered with the protector cover 8. The protector main body 7 and the protector cover 8 are fixed to each other by fitting between main body-side lock portions 9 (provided at plural positions) and cover-side lock portions 10 (provided at plural positions). The thus-configured protector 3 has a harness bend allowing portion 11 and a harness guide cylinder portion 12.

<Harness Bend Allowing Portion 11>

As shown in FIGS. 1, 2, and 12, the harness bend allowing portion 11 is formed so as to allow a bending movement of the wire harness 2 while housing and protecting the middle part 5 of the wire harness 2. Furthermore, the harness bend allowing portion 1I is formed so as to control deflection (a bend that causes fluttering) of the wire harness 2 in the Z direction. The harness bend allowing portion 11 has two kinds of bend restricting portions 13 and 14, a harness lead-out outlet 15, and a pair of deflection stop side walls 16. In the embodiment, as shown in FIGS. 1, 2, and 12, the harness bend allowing portion 11 is shaped like approximately ¼ of a circle. The harness bend allowing portion 11 is miniaturized because of the wire harness installation structure 1 according to the embodiment (made much smaller than in Comparative Example shown in FIGS. 14 and 15 (described later)).

The bend restricting portion 13 is a wall for restricting the bending range when the wire harness 2 is in the first form 2a. This wall extends straightly from the harness guide cylinder portion 12 and its height is greater than the diameter of the wire harness 2. On the other hand, the bend restricting portion 14 is a wall for restricting the bending range when the wire harness 2 is in the third form 2c. In other words, the bend restricting portion 14 is a wall for preventing the wire harness 2 from being bent excessively. The bend restricting portion 14 has a curved wall (given no reference symbol) that is continuous with the harness guide cylinder portion 12 and a straight wall (given no reference symbol) that is continuous with the curved wall. Reference symbol 17 denotes respective outside edges of the two kinds of bend restricting portions 13 and 14. The harness lead-out outlet 15 as a portion from which the wire harness 2 is led out is formed between the outside edges 17. The harness lead-out outlet 15 is an opening whose longer sides are shaped like an arc that is approximately ¼ of a circle.

The pair of deflection stop side walls 16 are two walls for restricting deflection of the wire harness 2 in the protector 3 (i.e., in the harness bend allowing portion 11). The arc-shaped edges of the pair of deflection stop side walls 16 define the harness lead-out outlet IS.

<Harness Guide Cylinder Portion 12>

The harness guide cylinder portion 12 is a cylinder-shaped portion that extends straightly in such a direction as to go away from the two kinds of bend restricting portions 13 and 14, the harness lead-out outlet 15, and the pair of deflection stop side walls 16. The harness guide cylinder portion 12 is a portion for guiding the wire harness 2 into the harness bend allowing portion 11. The harness guide cylinder portion 12 is long and narrow. A main body-side lock portion 9 and a cover-side lock portion 10 are disposed and formed at one end of the harness guide cylinder portion 12. A harness fixing portion 18 for fixing the first portion PT1 of the wire harness 2 is formed at the one end of the harness guide cylinder portion 12. The harness fixing portion 18 is a portion to which the wire harness 2 is fastened by a tie band (not shown).

<Bending Motion Mechanism 4>

As shown in FIGS. 1 and 2, the bending motion mechanism 4 is a mechanism for allowing the wire harness 2 to make a bending movement and, in the embodiment, is a 4-joint link structure (just an example; not limited to the one employed in the embodiment as long as a bending movement is enabled). The bending motion mechanism 4 may be such as to allow the wire harness 2 to make a bending movement using drive power of a motor, for example. Alternatively, the wire harness 2 may be allowed to make a bending movement by linking it to a movable part (e.g., movable roof) of a motor vehicle. Being a 4-joint link structure, the bending motion mechanism 4 employed in the embodiment has four links (first link 19, second link 20, third link 21, and fourth link 22) and four joints (first joint 23, second joint 24, third joint 25, and fourth joint 26).

<Four Links and Four Joints>

As shown in FIGS. 1-11, each of the four links is shaped like a band plate having a prescribed length. Each of the four joints joins two associated links in such a manner as to serve as a rotary shaft. A mode detailed description will be made below.

The first link 19 is a link that corresponds to a "driver" of the 4-joint link structure, and is used in such a manner that itself rotates (swings). The first link 19 is attached so as to be able to move the second link 20 and the third link 21 as itself rotates (swings). One end portion of the first link 19 is disposed at a position that is close to the end of the harness guide cylinder portion 12 of the protector 3. The one end portion of the first link 19 is attached to one end portion of the fourth link 22. The first joint 23 is formed in this attaching portion. The first link 19 is formed so that its other end portion projects beyond the arc-shaped edges of the deflection stop side walls 16 when the wire harness 2 is in the first form 2a.

The second link 20 is a link that corresponds to a "connector" of the 4-joint link structure. The second link 20 is shorter than the first link 19 in overall length. One end portion of the second link 20 is attached to the other end portion of the first link 19. The second joint 24 is formed in this attaching portion. The other end portion of the second link 20 is attached to a halfway portion of the third link 21. The third joint 25 is formed in this attaching portion.

The other end portion of the second link 20 is formed with a harness fixing portion 27. The harness fixing portion 27 is a portion for fixing the third portion PT3 of the wire harness 2. The harness fixing portion 27 is shaped like a projection piece (just an example) that projects from the other end portion of the second link 20. Like the harness fixing portion 18 of the protector 3, the harness fixing portion 27 is a portion to which the wire harness 2 is fastened by a tie band (not shown; just an example (for example, the wire harness 2 may be fastened to it by tape winding; there are no particular limitations on the manner of fastening as long as it can fix the third portion PT3)). The harness fixing portion 27 is disposed and formed so that the position of the third portion PT3 is offset from the above-mentioned imaginary straight line L.

The third link 21 is a link corresponding to a "follower" of the 4-joint link structure. The third link 21 is greater than the second link 20 in overall length. One end portion of the third link 21 is attached to the other end portion of the fourth link 22. The fourth joint 26 is formed in this attaching portion. The third link 21 has a straight portion 28 which extends from the one end portion to the halfway portion (where the third joint 25 exists).

The third link 21 is formed so that an inclined portion 29 and an offset portion 30 extend in this order from the halfway portion. The inclined portion 29 plus the offset portion 30 are shorter than the straight portion 28. The offset portion 30 is offset by a prescribed distance in the Z direction by the inclination of the inclined portion 29. The offset portion 30 is formed so as to extend parallel with the straight portion 28.

Such an offset portion 30 is formed with a harness fixing portion 31. The harness fixing portion 31 is formed as a portion for fixing the second portion PT2 of the wire harness 2. The harness fixing portion 31 is formed at the other end portion of the third link 21. More specifically, the harness fixing portion 31 is formed on one side surface of a tip portion of the offset portion 30 (just an example). Like the harness fixing portion 18 of the protector 3, the harness fixing portion 31 is a portion to which the wire harness 2 is fastened by a tie band (not shown; just an example (for example, the wire harness 2 may be fastened to it by tape winding; there are no particular limitations on the manner of fastening as long as it can fix the second portion PT2)).

The halfway portion (where the third joint 25 exists) of the third link 21 is disposed outside the arc-shaped edges of the deflection stop side walls 16. The other end portion of the third link 21 is disposed outside the halfway portion.

The fourth link 22 is a link corresponding to a "fixed link" of the 4-joint link structure. That is, the fourth link 22 is an unmovable link (the first link 19, the second link 20, and the third link 21 are movable links (members)). The fourth link 22 is fixed by an appropriate means. The fourth link 22 extends straightly from its one end to the other end. The fourth link 22 is disposed parallel with the harness guide cylinder portion 12 of the protector 3. The one end portion of the first link 19 is attached to the one end portion of the fourth link 22. The one end portion of the third link 21 is attached to the other end portion of the fourth link 22. The other end portion of the fourth link 22 is disposed according to the bending position 6 (see FIG. 10) of the wire harness 2, more specifically, in the vicinity of the bending position 6.

<Manner of Routing of Wire Harness 2>

Referring to FIGS. 3-5, a part of the middle part 5 of the wire harness 2 is housed in the harness guide cylinder portion 12 of the protector 3. The first portion PT1 of the wire harness 2 is fixed at the harness fixing portion 18 of the protector 3. Another part of the middle part 5 of the wire harness 2 is housed in the harness bend allowing portion 11. The third portion PT3 of a part, leading out of the harness lead-out outlet 15 of the harness bend allowing portion 11, of the wire harness 2 is fixed at the harness fixing portion 27 of the second link 20 of the bending motion mechanism 4. The second portion PT2 of the wire harness 2 is fixed at the harness fixing portion 31 of the third link 21 of the bending motion mechanism 4. The third portion PT3 of the wire harness 2 is located at a position that is offset in the direction R of a bending motion from the imaginary straight line L that connects the first portion PT1 and the second portion PT2. That is, the third portion PT3 is fixed at the offset portion.

When being in the first form 2a, the wire harness 2 is routed so as to be stretched. When being in the second form 2b or third form 2c (see FIGS. 6-11), the wire harness 2 is routed so as to be bent with the third portion PT3 fixed so as to be offset from the line connecting the bending position 6 and the second portion PT2. The wire harness 2 is routed so that a second excess length 33 that is an excess length between the second portion PT2 and the third portion PT3 is shorter than a first excess length 32 that is an excess length between the first portion PT1 and the third portion PT3. The first excess length 32 and the second excess length 33 are set at lengths that are necessary for a bending movement of the wire harness 2.

As for a bend of the wire harness 2 in the wire harness installation structure 1 according to the embodiment when it makes a bending movement, its part between the first portion PT1 and the third portion PT3 is in a bend interval. In the wire harness installation structure 1, since the wire harness 2 has the third portion PT3, the bend interval can be made shorter than in a case that the third portion PT3 does not exist, that is, the entire part from the first portion PT1 to the second portion PT2 is in a bend interval (Comparative Example shown in FIGS. 14 and 15). In Comparative Example shown in FIGS. 14 and 15, it is necessary to control deflection (suppress a bend) of a wire harness 101 because the bend interval is long, as a result of which a harness bend allowing portion 103 of a protector 102 is made larger. On the other hand, as is apparent from FIGS. 1-11, the protector 3 of the wire harness installation structure 1 is smaller. As such, the wire harness installation structure 1 provides an advantage that the protector 3 can be miniaturized.

<Manner of Routing of Wire Harness 2 Attained by Action of Bending Motion Mechanism 4>

In a state that the first link 19 is inclined as shown in FIGS. 3-5, the wire harness 2 assumes the first form 2a which corresponds to a "stretched routing state." This routing state is as shown in FIG. 13A when viewed from the X direction. As the first link 19 rises to establish a state shown in FIGS. 6-8, the third link 21 is also rotated (moved) and hence the wire harness 2 assumes a routing state as a result of a bending movement about the bending position 6. That is, the wire harness 2 assumes the second form 2b which corresponds to a "bending halfway routing state." This routing state is as shown in FIG. 13B when viewed from the X direction. When the first link 19 has risen completely to establish a state shown in FIGS. 9-11, the third link 21 is also raised to assume a posture shown in these figures. That is, the wire harness 2 assumes the third form 2c which corresponds to a "bending-completed routing state." This routing state is as shown in FIG. 13C when viewed from the X direction.

<Advantages of Wire Harness Installation Structure 1>

As described above with reference to FIGS. 1-15, in the wire harness installation structure 1 according to the embodiment, the first portion PT1, the second portion PT2, and the third portion PT3 are set in the wire harness 2, the first portion PT1 is fixed on the protector 3, and the positions of the second portion PT2 and the offset third portion PT3 are fixed on the respective movable members (second link 20 and third link 21) of the bending motion mechanism 4. Furthermore, as for excess lengths that are necessary for bending of the wire harness 2, the wire harness 2 is routed so that the excess length (second excess length 33) between the second portion PT2 and the third portion PT3 is shorter than the excess length (first excess length 32) between the first portion PT1 and the third portion PT3. Thus, the bending interval of the wire harness 2 can be made shorter than in conventional cases, as a result of which the wire harness installation structure 1 provides an advantage that deflection (a bend that leads to fluttering) occurring during bending/extending of the wire harness 2 can be controlled more easily. Since deflection (a bend that leads to fluttering) of the wire harness 2 can be controlled more easily, another advantage can be obtained that the protector 3 can be miniaturized.

It goes without saying that various modifications are possible without departing from the spirit and scope of the present disclosure.

The wire harness installation structure 1 according to the present disclosure can be employed in, for example, the roof, sheets, doors, etc. of motor vehicles where a wire harness needs to be bent and extended.

Here, the above embodiments are summarized as follows.

The present disclosure provides, as set forth in a first aspect, a wire harness installation structure including:
- a wire harness having bend flexibility;
- a protector configured to protect the wire harness while allowing the wire harness to make a bending movement about a bending position of the wire harness, the bending position being located between both ends of the wire harness; and
- a bending motion mechanism that causes the wire harness to make the bending movement, in which:
- the wire harness has a first portion that is fixed to the protector, a second portion that is distant from both of the first portion and the protector beyond the bending position, and a third portion that is located between the first portion and the second portion, and the third portion is offset in a direction of the bending movement from an imaginary straight line connecting the first portion and the second portion; and
- the second portion and the third portion of the wire harness are fixed on a movable member of the bending motion mechanism, and the wire harness is routed so that a second excess length between the second portion and the third portion is shorter than a first excess length between the first portion and the third portion.

In the above aspect of the present disclosure, the first portion, the second portion, and the third portion are set in the wire harness, the first portion is fixed on the protector, and the positions of the second portion and the offset third portion are fixed on the respective movable members of the bending motion mechanism. Furthermore, as for excess lengths that are necessary for bending of the wire harness, the wire harness is routed so that the excess length (second excess length) between the second portion and the third portion is shorter than the excess length (first excess length) between the first portion and the third portion. Thus, the bending interval of the wire harness can be made shorter than in conventional cases, as a result of which the wire harness installation structure provides an advantage that deflection (a bend that leads to fluttering) occurring during bending/extending of the wire harness can be controlled more easily (the advantage will be described later in embodiments). Since deflection (a bend that leads to fluttering) of the wire harness can be controlled more easily, another advantage can be obtained that the protector can be miniaturized.

In the wire harness installation structure set forth in a second aspect, the second portion and the third portion of the wire harness are fixed to the movable member at positions which are offset from the bending position by respective prescribed distances in a direction perpendicular to both of a direction of the bending movement and the imaginary straight line.

The above aspect of the present disclosure can provide a better arrangement of the second portion and the third portion with respect to the bending position of the wire harness.

In the wire harness installation structure set forth in a third aspect, the third portion of the wire harness is located outside the protector.

According to the above aspect of the present disclosure, since the third portion of the wire harness is located outside the protector and fixed there, the bending interval of the wire harness can be made shorter than in conventional cases. Thus, the protector can be miniaturized.

In the wire harness installation structure set forth in a forth aspect, the protector includes two kinds of bend restricting portions which restrict a bending range of the wire harness, a harness lead-out outlet which is formed between outside edges of the two kinds of bend restricting portions and through which the wire harness is led out, and a pair of deflection stop side walls which restrict deflection of the wire harness in the protector.

According to the above aspect of the present disclosure, since the two kinds of bend restricting portions, the harness lead-out outlet, and the pair of deflection stop side walls, the bending range of the wire harness can be restricted and deflection can be controlled. As such, this aspect of the invention can provide a protector that is in a better form.

In the wire harness installation structure set forth in a fifth aspect, the protector has a harness guide cylinder portion which extends in such a direction as to be separate from the two kinds of bend restricting portions, the harness lead-out outlet, and the pair of deflection stop side walls, and the harness guide cylinder portion is formed with a harness fixing portion for fixing the first portion of the wire harness.

According to the above aspect of the invention, since the protector further has the harness guide cylinder portion and the harness fixing portion, the wire harness can be guided and protected by the harness guide cylinder portion. Furthermore, bending and extending of the wire harness can be made more stable by fixing the first portion at the harness fixing portion.

In the wire harness installation structure according to the present disclosure, the first portion of the wire harness is fixed on the protector and the positions of the second portion and the offset third portion are fixed on the respective movable members of the bending motion mechanism. Furthermore, as for excess lengths that are necessary for bending of the wire harness, the wire harness is routed so that the excess length between the second portion and the third portion is shorter than the excess length between the first portion and the third portion. Thus, the bending interval of the wire harness can be made shorter than in conventional cases, as a result of which the wire harness installation structure provides an advantage that deflection (a bend that leads to fluttering) occurring during bending/extending of the wire harness can be controlled more easily. Since deflection of the wire harness can be controlled more easily, another advantage can be obtained that the protector can be miniaturized.

What is claimed is:

1. A wire harness installation structure comprising:
- a wire harness having bend flexibility;
- a protector configured to protect the wire harness while allowing the wire harness to make a bending movement about a bending position of the wire harness, the bending position being located between both ends of the wire harness; and
- a bending motion mechanism that causes the wire harness to make the bending movement, the bending motion mechanism including a first link and a second link that an end portion of the second link is attached to a halfway portion of the first link, wherein:
- the wire harness is at least one electric wire;
- the wire harness has a first portion that is fixed to the protector, a second portion that is distant from both of the first portion and the protector beyond the bending position, and a third portion that is located between the first portion and the second portion, and the third portion is offset in a direction of the bending movement from an imaginary straight line connecting the first portion and the second portion;

the second portion of the at least one electric wire and the third portion of the at least one electric wire are directly fixed on a first harness fixing portion of the first link and a second harness fixing portion of the second link respectively, upon movement of one or more links of the bending motion mechanism the wire harness experiences a change in bend between the first portion and the third portion and between the second portion and the third portion, and the wire harness is routed so that a second excess length between the second portion and the third portion is shorter than a first excess length between the first portion and the third portion;

the first harness fixing portion of the first link is formed at an end portion of the first link; and the second harness fixing portion of the second link is shaped like a projection piece that projects from the end portion of the second link that is attached to the halfway portion of the first link.

2. The wire harness installation structure according to claim 1, wherein the second portion of the at least one electric wire and the third portion of the at least one electric wire are fixed to the first harness fixing portion and the second harness fixing portion respectively, at positions which are offset from the bending position by respective prescribed distances in a direction perpendicular to both of a direction of the bending movement and the imaginary straight line.

3. The wire harness installation structure according to claim 1, wherein the third portion of the at least one electric wire is located outside the protector.

4. The wire harness installation structure according to claim 1, wherein the protector includes two kinds of bend restricting portions which restrict a bending range of the wire harness, a harness lead-out outlet which is formed between outside edges of the two kinds of bend restricting portions and through which the wire harness is led out, and a pair of deflection stop side walls which restrict deflection of the wire harness in the protector.

5. The wire harness installation structure according to claim 4, wherein the protector has a harness guide cylinder portion which extends in such a direction as to be separate from the two kinds of bend restricting portions, the harness lead-out outlet, and the pair of deflection stop side walls, and the harness guide cylinder portion is formed with a harness fixing portion for fixing the first portion of the wire harness.

6. The wire harness installation structure according to claim 1,
wherein the second portion and the third portion are each outside of the protector.

7. The wire harness installation structure according to claim 1,
wherein the wire harness is routed through a first opening of the protector and a second opening of the protector,
wherein, along a longitudinal direction of the protector, the first opening is opposite to the second opening, and
wherein the bending motion mechanism comprises a first portion that is closer to the first opening than to the second opening, and
wherein the bending motion mechanism comprises a second portion that is closer to the second opening than to the first opening.

8. The wire harness installation structure according to claim 7,
wherein the protector comprises a harness bend allowing portion and a harness guide cylindrical portion,
wherein the harness bend allowing portion comprises the first opening,
wherein the harness guide cylindrical portion comprises the second opening,
wherein, along the longitudinal direction of the protector, the protector comprises a first wall that is flat, rectangular, and extended from the first opening to the second opening, and
wherein, along the longitudinal direction of the protector, the protector comprises a second wall that extended from the first opening to the second opening, is perpendicular, at the harness bend allowing portion, to the first wall, and is parallel, at the harness guide cylindrical portion, to the first wall.

9. A wire harness installation structure comprising:
a wire harness having bend flexibility;
a protector configured to protect the wire harness while allowing the wire harness to make a bending movement about a bending position of the wire harness, the bending position being located between both ends of the wire harness; and
a bending motion mechanism that causes the wire harness to make the bending movement, the bending motion mechanism including a first link and a second link that an end portion of the second link is attached to a halfway portion of the first link, wherein:
the wire harness has a first portion that is fixed to the protector, a second portion that is distant from both of the first portion and the protector beyond the bending position, and a third portion that is located between the first portion and the second portion, and the third portion is offset in a direction of the bending movement from an imaginary straight line connecting the first portion and the second portion when the wire harness is in a first form in which the wire harness is routed so as to be stretched;
the second portion and the third portion of the wire harness are fixed on a first harness fixing portion of the first link and a second harness fixing portion of the second link respectively, such that upon movement of one or more links of the bending motion mechanism the wire harness experiences a change in bend between the first portion and the third portion and between the second portion and the third portion, and the wire harness is routed so that a second excess length between the second portion and the third portion is shorter than a first excess length between the first portion and the third portion;
the second portion and the third portion are each outside of the protector;
the first harness fixing portion of the first link is formed at an end portion of the first link; and
the second harness fixing portion of the second link is shaped like a projection piece that projects from the end portion of the second link that is attached to the halfway portion of the first link.

10. The wire harness installation structure according to claim 9, wherein the second portion and the third portion of the wire harness are fixed to the first harness fixing portion of the first link and the second harness fixing portion of the second link at positions which are offset from the bending position by respective prescribed distances in a direction perpendicular to both of a direction of the bending movement and the imaginary straight line.

11. The wire harness installation structure according to claim 9, wherein the third portion of the wire harness is located outside the protector.

12. The wire harness installation structure according to claim 9, wherein the protector includes two kinds of bend restricting portions which restrict a bending range of the wire harness, a harness lead-out outlet which is formed between outside edges of the two kinds of bend restricting portions and through which the wire harness is led out, and a pair of deflection stop side walls which restrict deflection of the wire harness in the protector.

13. The wire harness installation structure according to claim 12, wherein the protector has a harness guide cylinder portion which extends in such a direction as to be separate from the two kinds of bend restricting portions, the harness lead-out outlet, and the pair of deflection stop side walls, and the harness guide cylinder portion is formed with a harness fixing portion for fixing the first portion of the wire harness.

14. The wire harness installation structure according to claim 9,
   wherein the second portion and the third portion of the wire harness are directly fixed on a first harness fixing portion and a second harness fixing portion of the bending motion mechanism, respectively.

\* \* \* \* \*